United States Patent [19]

Ikegaya et al.

[11] Patent Number: 5,288,105
[45] Date of Patent: Feb. 22, 1994

[54] SAFETY BELT SYSTEM WITH EMERGENCY RETRACTION CAPABILITY

[75] Inventors: Isao Ikegaya; Naotoshi Nishikawa, both of Shizuoka, Japan

[73] Assignee: Fuji Kiko Co., Ltd., Japan

[21] Appl. No.: 837,390

[22] Filed: Feb. 19, 1992

[30] Foreign Application Priority Data

Feb. 27, 1991 [JP] Japan .............................. 3-009668[U]
Feb. 27, 1991 [JP] Japan .............................. 3-009669[U]

[51] Int. Cl.$^5$ .......................................... B60R 22/46
[52] U.S. Cl. ..................................... 280/806; 297/480
[58] Field of Search ................ 280/801, 806; 297/480

[56] References Cited

U.S. PATENT DOCUMENTS 4,705,296 11/1987 Andersson et al. ................. 280/806
4,768,809 9/1988 Andersson et al. ................. 280/806

FOREIGN PATENT DOCUMENTS 0300469 1/1989 European Pat. Off. .
0306299 8/1989 European Pat. Off. .
3844130 5/1990 Fed. Rep. of Germany ...... 280/806
2639012 11/1989 France .
61-241234 10/1986 Japan .
62-289451 12/1987 Japan .

*Primary Examiner*—Margaret A. Focarino
*Assistant Examiner*—Peter C. English
*Attorney, Agent, or Firm*—Ronald P. Kananen

[57] ABSTRACT

A vehicle safety belt pre-tensioning system includes a slider to which a cable is attached. The slider is affixed to a safety belt buckle and to a cable for pulling the buckle forcibly downward to secure a seat occupant upon occurrence of an emergency condition. The cable is arranged parallel to a guide groove of a guide plate and is guide into a sensor mechanism via a roller. The other end of the cable is affixed to a piston. A portion of the cable is fixed in a tube which is arranged in the sensor mechanism. The sensor mechanism activates a trigger upon detecting an emergency condition. Between the sensor mechanism and the piston, a coil spring is held in a compressed state. Within the sensor mechanism, the tube is retained by a pawl which also contacts a link which is positioned proximate a pin, or trigger, associated with a sensor mass. When vehicle motion indicatives an emergency condition, the sensor mass moves so as to cause the pin to break the link. Thus, the pawl moves so as to release the tube. When the tube is released the piston is moved away from the sensor mechanism by the sudden expansion of the compressed coil spring. This pulls the cable, causing the slider and buckle to be pulled rapidly downward, tightening a safety belt attached to the buckle for securing the seat occupant. The assembly is attached to a side of an upper rail of a seat mounting.

73 Claims, 15 Drawing Sheets

SAFETY BELT SYSTEM WITH EMERGENCY RETRACTION CAPABILITY

BACKGROUND OF THE INVENTION

1. Field of the Invention

The present invention relates generally to a safety belt for automotive vehicles. Particularly, the present invention relates to a vehicle safety belt and buckle with emergency retraction capability.

2. Description of the Prior Art

In modern automotive technologies, emergency lock safety belt arrangements have been developed in various constructions. Emergency lock safety belt arrangements generally operate to lock a safety belt for preventing extraction of the belt in response to an extraordinary magnitude of deceleration which can be caused upon vehicle collision. Such a so-called, passive safety belt arrangement is generally successful in protecting a seat occupant from colliding into vehicular structural components during collision impact.

On the other hand, these arrangements tend to tightly restrict a seat occupant onto the seat even when no emergency condition exists. This may lead to discomfort and restricted freedom of movement of the seat occupant and may degrade riding enjoyment or, through discomfort, lead a vehicle occupant to neglect to use the safety belt entirely.

In order to address this situation, some modern safety belt arrangements are provided with a tension reducing capability to permit locking the safety belt at a position extracted in length to slightly more than that required for firmly restricting the seat occupant. This so-called active safety belt arrangement reduces tightness of the belt under normal driving conditions and improves riding comfort. For establishing an emergency lock function, a belt retractor is normally employed. The emergency lock safety belt retractor is sensitive to an inertial moment exerted on the vehicular body to establish locking of the safety belt when a length of the inertial moment exceeds a predetermined time. Some emergency lock safety belt retractors also employ a webbing sensor, which senses an extraction speed of the safety belt, to establish locking when the belt extraction speed is extraordinary high. With such an arrangement, locking is necessarily established after extraction of a certain length of belt.

As such arrangements allow a greater degree of slack, a certain magnitude of movement is available to the seat occupant. Particularly when the safety belt arrangement employs the aforementioned reduced tension arrangement, a magnitude of movement allowed the seat occupant in response to extraordinary deceleration becomes greater. As can be appreciated, upon vehicular collison, it is preferred to restrict the seat occupant to the seat as firmly as possible. Therefore, advanced safety belt systems utilize such types of arrangements in combination with a pre-loader which forcingly retracts the belt for firmly restricting the seat occupant with increased tension upon collision, or with an air bag system which forms an air cushion for preventing the seat occupant from colliding with vehicular structural components located in front of the seat. One example of such a pre-loader mechanism is disclosed in Japanese Patent Application First Publication (Unexamined) Showa 57-128169, for example.

Such additional equipment of course necessitates added production costs. In order to avoid these, there has been proposed mechanical buckle pretensioners which draw a safety belt buckle in a tensioning direction to provide additional tension for the belt. Such types of mechanical buckle pre-tensioners have been disclosed in Japanese Patent Application First (unexamined) Publications Nos. 61-241234 and 62-289451, for example. The mechanical buckle pre-tensioner employs a trigger mechanism for causing pre-tensioning operation in response to collision shock. However, the trigger mechanism is relatively bulky. Since the trigger mechanism needs to be associated with the safety belt buckle, it must be positioned proximate the buckle. Due to the bulky nature of the mechanism, this causes interference with the positioning of vehicle structural components, such as a console box, and so forth. Furthermore, since modern vehicle seats usually employ a reclining mechanism for adjusting a seat angular position, in addition to the safety belt mechanism, the structural assembly around the seats become complicated and difficult to install, increasing the space and expense required as well as the weight of the vehicle.

SUMMARY OF THE INVENTION

It is therefore a principal object of the present invention to provide a safety belt buckle pretensioner system which is compact and suitable for installation with a seat back reclining mechanism.

In order to accomplish the aforementioned and other objects, a vehicle safety belt arrangement having emergency retraction capability is provided, comprising: slider means associated with a buckle of a safety belt, the slider means being movable in at least one direction for effecting retraction of the safety belt toward a hip point of a vehicle seat; a guide plate having formed therein a groove for guiding the slider means in the one direction; sensor means including a base portion and a sensor mass, pivotable relative the base portion so as to be movable in at least one direction and responsive to motion of the vehicle; a bracket connected to one side of the sensor means for establishing a positional relationship between the sensor means and the guide plate; drive means including a piston, the drive means being connected to a side of the sensor means opposite the bracket and operable to move the piston in a direction away from the sensor means; a roller, mounted on the bracket, the guide plate and the roller being mounted on different surfaces of the bracket respectively; a cable connecting the piston of the drive means to the slider means via the sensor means, a portion of the cable length engaging the roller for establishing a cable path from the slider to the sensor means and another portion of the cable length being releasably fixed in position within the sensor means; and, trigger means associated with the sensor mass of the sensor means for activating the emergency retraction to a triggered position of the arrangement according to motion of the sensor mass indicative of an emergency condition, the trigger means releasing the portion of the cable length fixed within the sensor means to activate the drive means to move the piston away from the sensor means thus forcibly pulling the slider means in the one direction.

According to another aspect of the present invention, a vehicle safety belt arrangement having emergency retraction capability is provided, comprising: slider means associated with a buckle of a safety belt, the slider means being movable in at least one direction for effecting retraction of the safety belt toward a hip point of a vehicle seat; a guide plate having formed therein a groove for guiding the slider means in the one direction, the guide plate having a roller mounted on a bottom portion thereof; sensor means including a base portion and a sensor mass, pivotable relative the base portion so as to be movable in at least one direction and responsive to motion of the vehicle; a plate, a mounting of the roller attaching a portion of the plate to the guide plate, another portion of the plate being attached to the sensor means, the plate establishing a positional relationship between the guide plate and the sensor means; drive means including a piston, the drive means being connected to a side of the sensor means opposite the plate and operable to move the piston in a direction away from the sensor means; a cable connecting the piston of the drive means to the slider means via the sensor means, a portion of the cable length engaging the roller for establishing a cable path from the slider to the sensor means and another portion of the cable length being releasably fixed in position within the sensor means; and trigger means associated with the sensor mass of the sensor means for activating the emergency retraction to a triggered position of the arrangement according to motion of the sensor mass indicative of an emergency condition, the trigger means releasing the portion of the cable length fixed within the sensor means to activate the drive means to move the piston away from the sensor means thus forcibly pulling the slider means in the one direction.

DESCRIPTION OF THE PREFERRED EMBODIMENT

Figure 1:
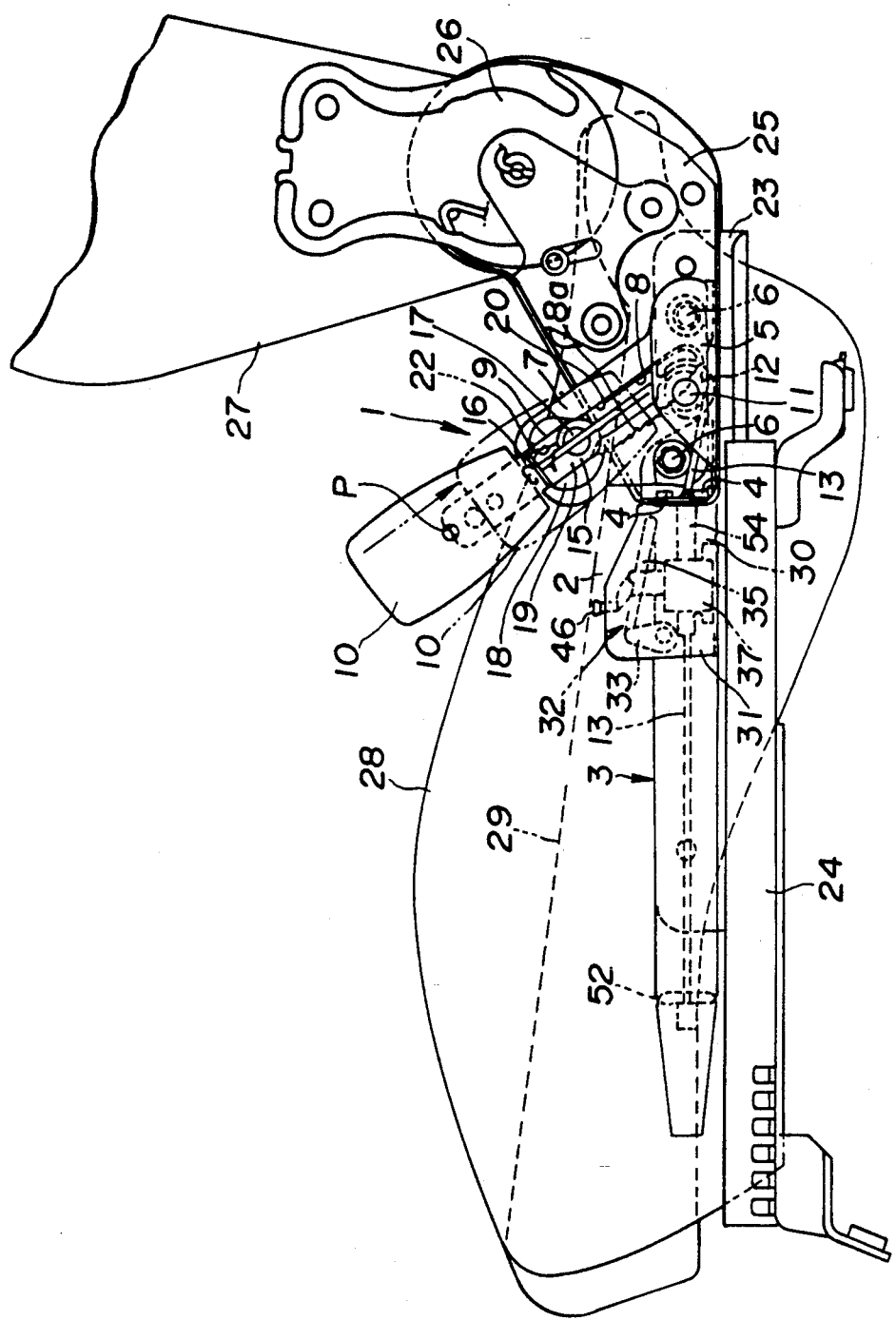
FIG. 1 is a cut-away side view of a safety belt system including detail of the safety belt buckle and pre-tensioner arrangement of the present invention.

Referring now to the drawings, particularly to FIG. 1, a buckle pre-tensioner 1, a sensor mechanism 2 and a drive mechanism 3 are shown. End bolts 4, 4 secure a bracket 5 which receives bolts 6, 6 therethrough which retain a guide plate 7. The guide plate 7 has a guide groove 8 formed therein with one side thereof being formed with gear teeth 8a. The gear teeth 8a engage with a ratchet 19 for controlling the positioning of a slider 9 which is connected to a buckle 10.

Figure 4:
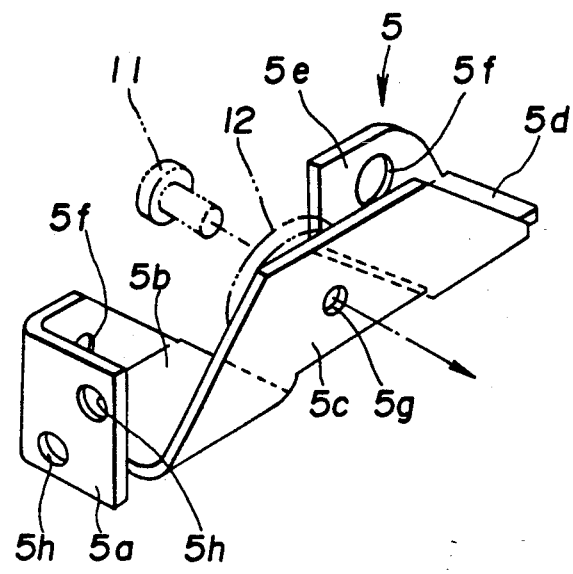
FIG. 4 is a perspective view of the bracket of FIG. 2.

FIG. 4 shows the bracket 5 in detail. As can be seen in the drawing, the bracket 5 includes a retaining portion 5a, a bottom portion 5b, a first side face 5c and a second bottom portion 5d which is separated from the bottom portion 5b. Both bottom portions 5b and 5d are on the same plane and are joined to the first side face 5c at one edge thereof. A second side face 5e, arranged parallel to the first face 5c, is joined to the second bottom portion 5d at an edge of the bottom portion 5d opposite that which joins the first side face 5c. The retaining portion is secured via bolts 4, 4 which are inserted through holes 5h, 5h provided in the retaining portion 5a. The retaining portion 5a and the second side face 5e respectively receive bolts 6, 6 through holes 5f, 5f provided therethrough. Further, through a hole 5g provided in the first side face 5c, a roller 12 is rotatably mounted via a pin 11.

Figure 2:
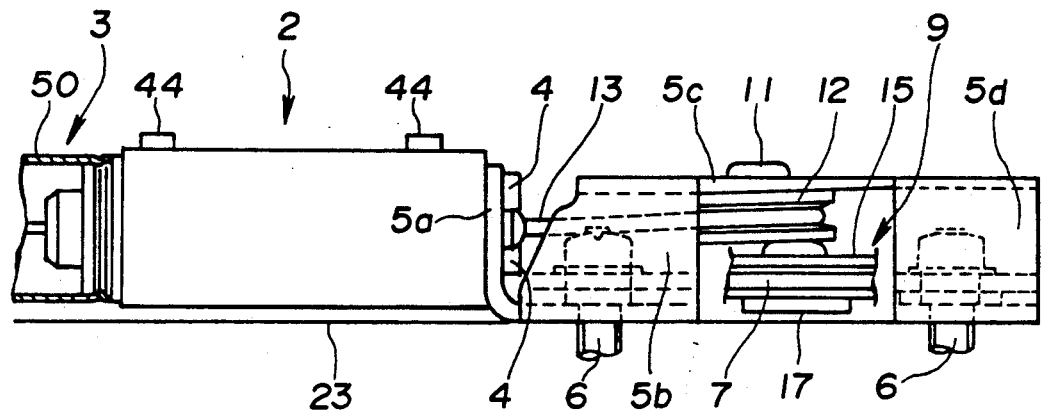
FIG. 2 is a bottom view which shows detail of the relationship between a bracket, slider, and a sensor mechanism.
Figure 3:
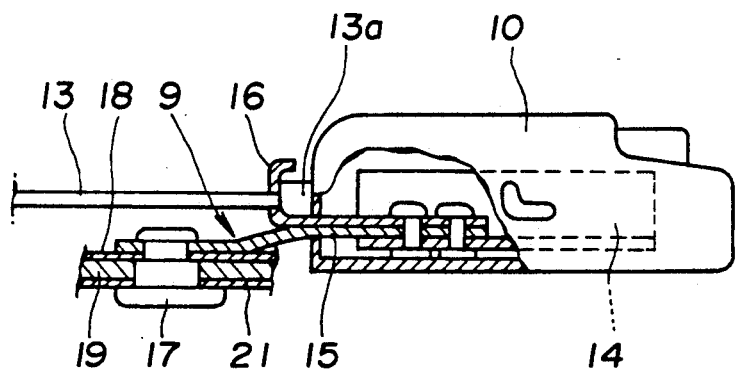
FIG. 3 is a cross sectional view of a first embodiment of a safety belt buckle and slider assembly.

FIG. 2 shows detail of the bracket 5 as installed and showing the arrangement of the pin 11 and roller 12. Referring to FIG. 2, a cable 13 is wound around the roller 12 and passes through the sensor portion 2 via a fixed tube 54. As best seen in FIG. 3, an end of the cable 13 is anchored to a hook portion 16 at a lower portion of the buckle 10 via a cable anchor 13a. The hook portion 16 is joined to a connecting member 15 thereby associating the cable 13 and buckle 10 with the slider 9.

Figure 5:
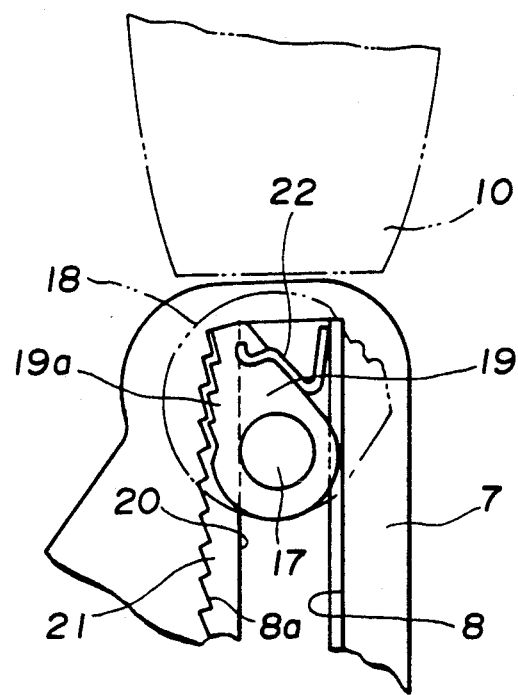
FIG. 5 is a cut-away side view of a ratchet portion of the buckle of FIG. 3.

Referring to FIG. 3, a seat portion 14 of the buckle 10 is joined with the hook portion 16 and the connecting member 15, another portion of the connecting member 15 is attached to a pin 17 by caulking, for example. In FIG. 5 it can be seen that a shield 18 is held between the pin 17 and the guide plate 7. The pin 17 also joins the connecting member 15 with the shield 18, a ratchet member 19 and a plate 21. It will be noted that sliding motion in the longitudinal direction of the pin 17 is allowed for, thus forming a joint, or rotatable axis for the connecting member 15, the shield 18, the ratchet member 19 and the plate 21, and further an opening is formed in longitudinal direction of the plate 21. The above described assembly is positioned in the guide groove 8 along one side of which ratchet teeth 8a are formed. The ratchet teeth 8a are always engaged with the ratchet teeth 19a of the ratchet member 19 and a spring 22 is provided in an upper part of the guide groove 8 which biases the ratchet member 19 against the ratchet teeth 8a.

As may be seen in FIG. 1, the buckle pretensioner 1, the drive mechanism 3, containing a coil spring 51 in a compressed state, and a trigger mechanism 32 are fixed at one side of a seat cushion 28. Further, the pivot, or hip point P of the buckle 10 is established according to the fixing of the bracket 5 to an upper rail 23 of the seat mounting. The upper rail 23 is slidably engaged with a lower rail 24 and a base plate 25 for a seat reclining arrangement is attached to the bracket 5 via the bolts 6, 6. The base plate 25 is rotatably joined to an arm portion 26 for establishing a seat back 27 in a reclined position. The seat cushion 28 is provided over a seat base, or seat pan 29.

Hereinbelow, the sensor mechanism 2 will be explained in detail.

Figure 6:
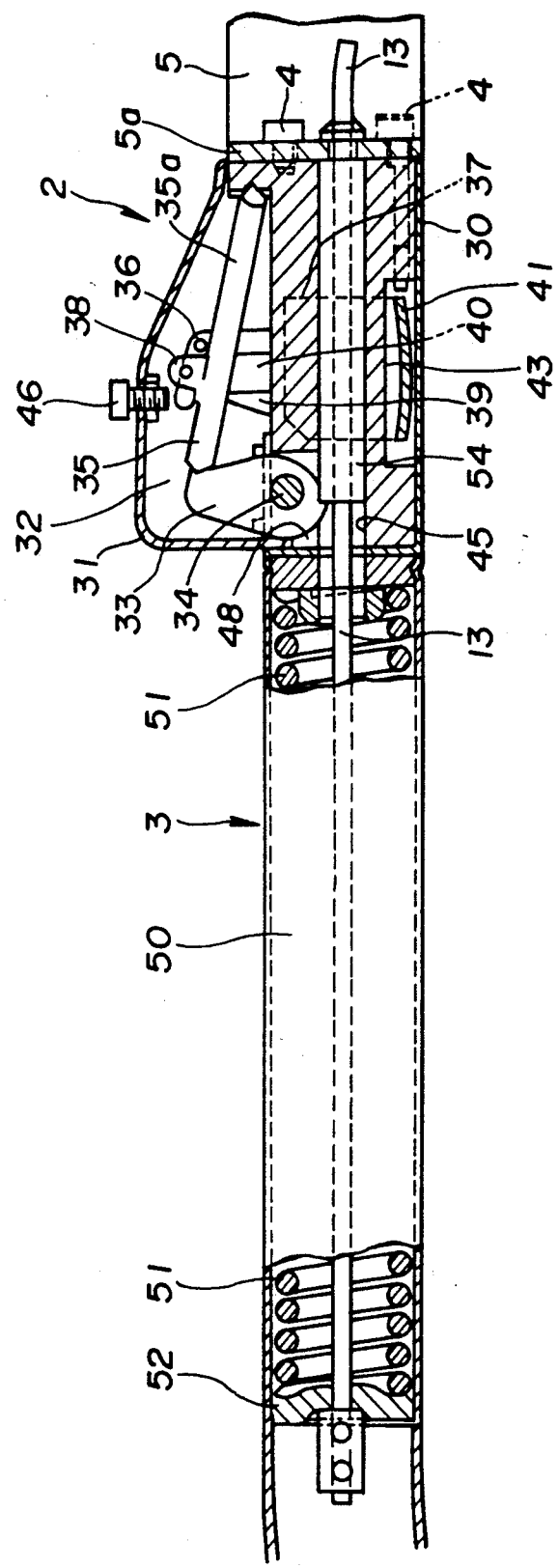
FIG. 6 is a cut-away side view of a sensor mechanism.
Figure 7:
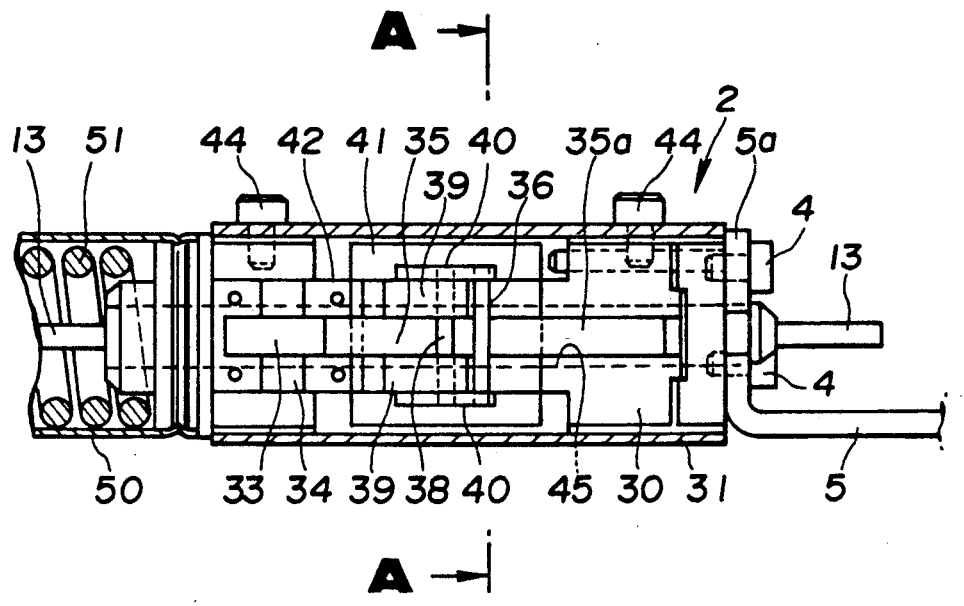
FIG. 7 is a plan view of the sensor mechanism of the present invention.
Figure 8:
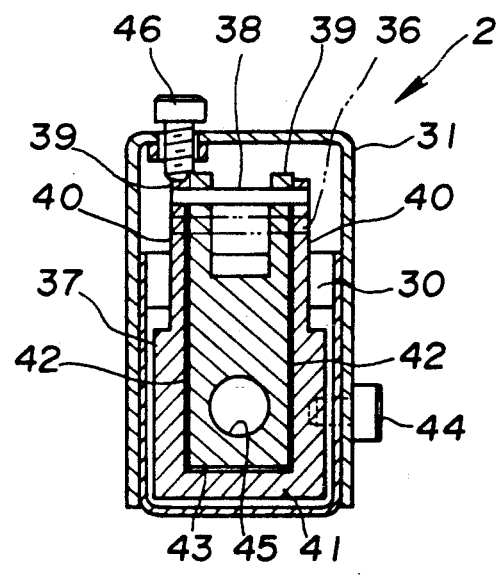
FIG. 8 is a cross sectional view of the sensor mechanism taken along line A—A of FIG. 7.

Referring to FIGS. 1 and 6, the sensor mechanism 2 is joined to the above-described bracket 5 (see FIG. 4) and a base 30, of the sensor mechanism 2 receives thereover a cover 31. Within the cover 31 a trigger mechanism 32 is mounted. The base 30 also supports a cylindrical tube-shaped body 50 having a tapered forward end of the driving mechanism 3. FIGS. 6 to 8 show the trigger and driving mechanism in detail. As can be seen from the drawings, a mid portion of the cable 13 passes through the sensor via a guide tube 54 which is aligned with a guide passage 45 of the base 30. The cable 13 is adhered to the guide tube 54 so that it may not pass freely through the guide tube 54. The tube is retained in place by a pawl 33. A groove 48 is provided at one end of the base 30 and a portion of the guide tube 54 rests on the bottom of the groove 48. The releasable locking pawl 33 is also mounted in the groove 48 on a rotatable axis 34, a top portion of the pawl 33 is releasably engaged with an end of a link member 35 and the bottom portion retains the guide tube 54 in position. An end of the link member 35 opposite the end engaging the pawl 33 engages a second link member 35a. The engaging portions of the first and second link members 35 and 35a may be formed with one surface being pointed and the other having a V-shaped cut therein for receiving the point, for example. An end of the second link member 35a opposite that which engages the link member 35 may also be formed with a pointed end. This end rests in a receiving indentation formed in the base 30. The link members 35 and 35a are positioned between arm portions 39, 39. A pin, or pivotal axis 38 is set through the arm portions 39, 39 at a position above the link members 35, 35a, this pivotal axis 38 is of a length greater than the distance between the two arm portions 39, 39 for extending slightly beyond the arm portions 39, 39 on the outward facing sides of each arm member 39 respectively for rotatably supporting second arm portions 40, from which a sensor mass 37 is suspended. A stop pin 36 is set through the second arm portions 40, 40 at a location as to almost contact an upper surface of the link members 35, 35a.

The sensor mass 37, as may be seen in FIG. 8, is provided at each side surface of the base and includes a weight portion 41 at a bottom portion thereof, which bottom portion may be formed to bridge a lower portion of the base 30. The second arm portions 40, 40, the sensor mass 37 and the weight portion 41 may all be integrally formed, for example. The sensor mass is separated from the base 30 and from the arm portions 39, 39 by cut outs 42, 42 on each side thereof and from a cutout portion 43 corresponding to the top of the weight portion 41. Thus the sensor mass, suspended from the pivotal axis 38 is made sensitive to vehicle vibration. The degree of vibration sensitivity may be adjusted by a control screw 46 which penetrates a top portion of the cover 31 to contact the top of a protruding portion of one of the second arm portions 40. Further, two screws 44, 44 penetrate the cover 31 at one side thereof to secure the cover 31 to the base 30.

Referring again to FIG. 6, the construction of the drive mechanism 3 will be explained in detail. As may be seen in the drawing, the tube body 50 of the driving mechanism 3 is connected to the base 30 of the sensor 2. Within the tube body 50 a coil spring 51 is arranged in a compressed condition, one end of the coil spring rests against a spring seat 52. The cable 13 passes out of the sensor 2, through the center of the coil spring 51 and the end of the cable 13 is anchored at the spring seat 52.

Hereinbelow, the operation of the safety belt system of the invention under an emergency condition will be explained.

In the sensor 2, since the sensor mass 37 is suspended from the pivotal axis 38 via the second arm portions 40, movement in the forward direction (to the left in FIG. 6), as caused by abrupt deceleration or impact, causes the upper surface of the link members 35, 35a to come into contact with the stop pin 36 which exerts downward force on the link members causing them to separate, or break in the downward direction. This frees the pawl 33 to fall in the forward direction, thereby releasing the guide tube 54 and the cable 13 adhered therein. The releasing of the tube 54 frees the cable and allows the compressed coil spring 51 to expand to the limit of the cable.

As the cable is pulled (to the left viewing FIG. 6), the other end of the cable pulls the hook portion 16 together with the connecting portion 15 downward causing the slider 9 of the buckle mechanism to also be pulled in the downward direction along the guide groove 8. The pin 17 is thus guided along the longitudinal groove 20 and brought down to the bottom of the groove 8 forcing the slider and buckle down towards the seat cushion 28. Thus, the slider 9 and the buckle 10 are pulled down and the spring 22 associated with the ratchet 19 ensures engagement between the ratchet teeth 19a and the ratchet teeth 8a of the guide groove. Due to this engagement, movement of the buckle in the upward direction is surely prevented. By this action, a seat occupant is securely restrained against the seat back 27. It will further be noted from FIG. 2, that, in a triggered condition of the sensor 2, a portion of the slider overlaps the roller 11 mounted on the bracket 5. Due to this arrangement, operational space required by the mechanism is reduced and design freedom in mounting the arrangement of the invention is increased.

Thus, the guide plate 7 and the cable 13 associated with the roller 12, respectively contribute to allow the buckle pre-tensioning arrangement of the invention to become small in size and also to provide optimum safety for vehicle occupants.

Hereinbelow, a second embodiment of a safety belt system according to the present invention will be described with reference to FIGS. 9-13.

Figure 9:
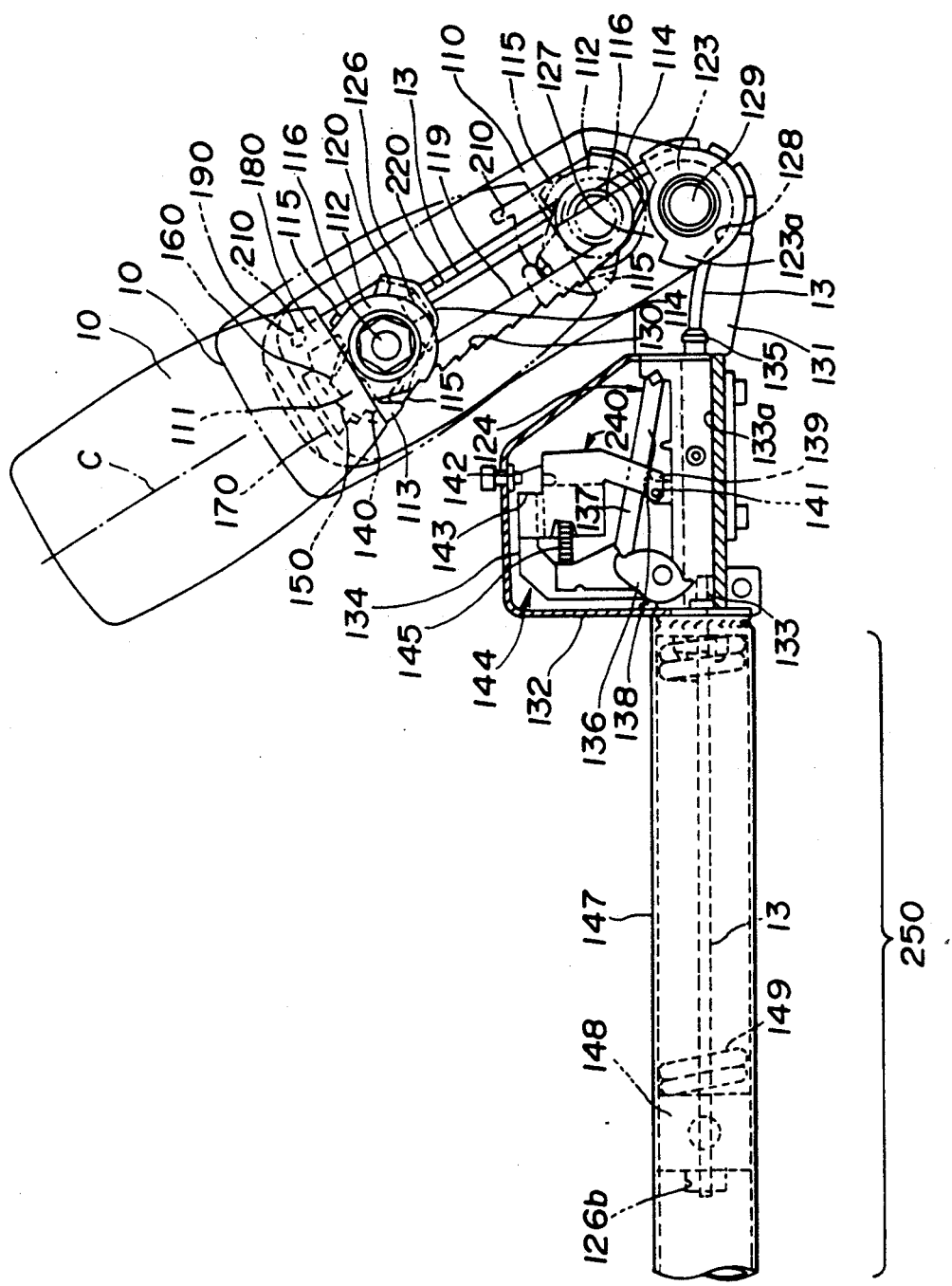
FIG. 9, shows a cut-away side view of the overall arrangement of a second embodiment of a safety belt pre-tensioning system.

The slider construction of the present embodiment differs from the previous embodiment in that the buckle is offset from the guide plate and an overlap is provided between the guide plate and the buckle. FIG. 9, shows an overall view of the arrangement of the second embodiment, while FIG. 10 shows a side view of the slider assembly and FIG. 11 shows a plan view of the slider assembly of FIG. 10.

Figure 10:
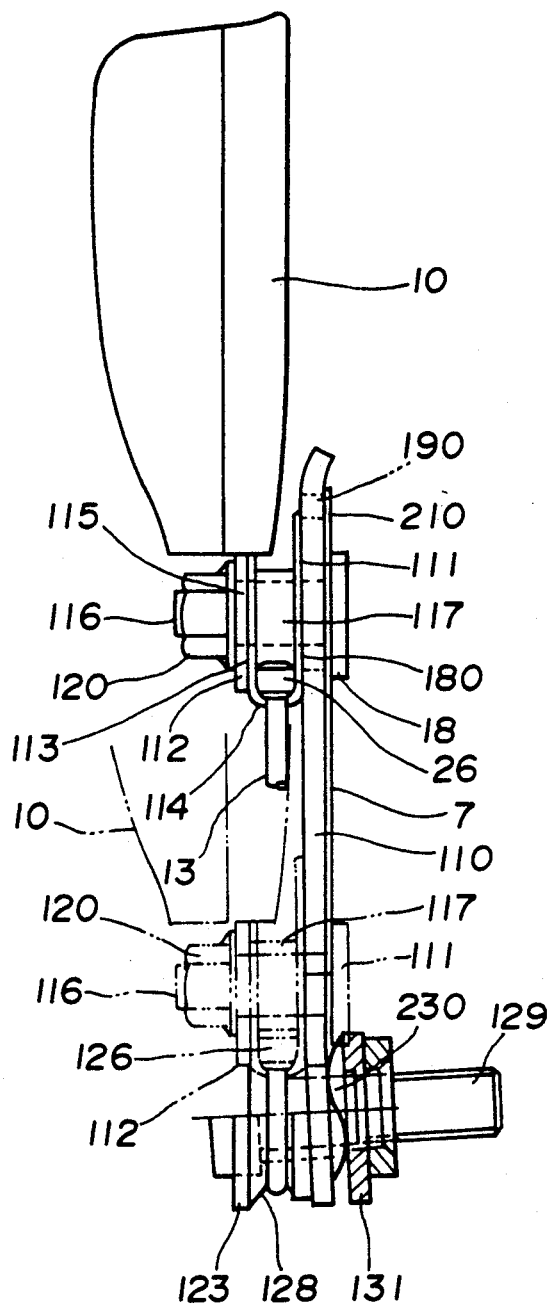
FIG. 10 shows a side view of the slider assembly of the second embodiment.
Figure 11:
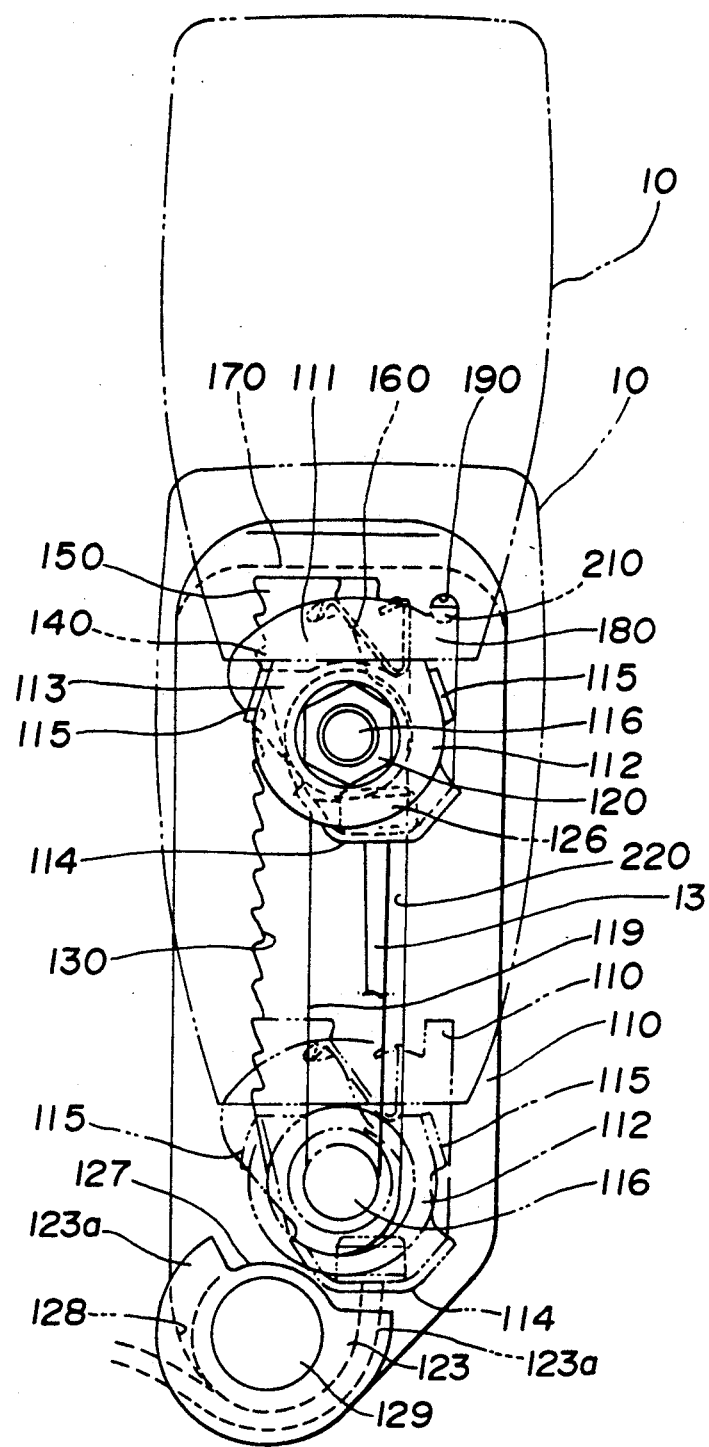
FIG. 11 shows a plan view of the slider assembly of FIG. 10.

Referring to FIGS. 10 and 11, a safety belt arrangement of the second embodiment includes a guide plate 110 provided with a longitudinal guide groove 220 therethrough. Provided along one side of the guide groove 220 ratchet teeth 130 are provided. The ratchet teeth 130 engage with ratchet teeth 140 of a latch 150, the ratchet teeth 140 of the latch 150 being maintained in engagement with the ratchet teeth 130 by the spring force of a spring 160. One end of the spring 160 engages the latch 150 and the other end of the spring 160 is thrust against a side of the guide groove opposite the toothed side 130. The latch 150 and the guide plate 110 are made of metal plate, for example, and are of substantially the same thickness. The face of the guide plate 110 opposite that side on which the latch 150 is provided is in rubbing contact with a cover plate 170. According to this construction, downward motion of the latch 150 in the guide groove 220 is permitted but upward motion of the latch is surely prevented.

As can be seen in FIG. 10, the latch 150 is kept from coming out of alignment with the guide plate 110 by a slider 180, a face of which is kept in sliding contact with a face of the guide plate 110. That is to say, the latch 150 is held on the same plane as the guide plate 110 by being sandwiched between the slider 180 and the cover plate 170. A hook portion 210 suspends the slider 180 from a perforation 190 provided in an upper part of the guide plate 110, while a retainer portion 111 on the slider covers a major portion of the latch 150. Further, a buckle 10 is joined to a connecting member 112, layered with a second connecting member 113. The distance between the retainer portion 111 of the slider 180 and the buckle connecting member 113 is fixed by an intervening cable retainer portion 114 provided therebetween at right angles to the connecting member 113 and the retainer portion 111 forming a substantially U-shaped structure, as may be seen in FIG. 10. It will be noted that the retainer portion 111, the connecting member 113 and the cable retainer portion 114 may be integrally formed. It will further be noted that, if the hook portion 210 is subjected to extreme downward pulling force, it easily disengages from the perforation 190.

As seen in FIGS. 9-11, the connection members 112 and 113 and the retainer portion 111 are assembled together by a bolt 116 and held by a nut 120, further, a spacer 117 is provided coaxially with the bolt 116 between the connecting member 113 and the retainer portion 111.

To prevent rotational movement of the slider 180 and the buckle connecting member 113, the connecting member 112 is formed with stopper portions 115, 115. A cable 13 is connected to the bottom surface of the U-shaped cable retainer portion 114. In an emergency condition the cable 13 serves to pull the buckle 10, the slider 180 and the latch 150 downward along a line C as shown in FIG. 9. It will be noted that an annular head 118 of the bolt 116 is provided outside of an outer face of the cover plate 170, such that movement of the entire assembly may be guided along a longitudinal guide groove 119 of the cover plate 170.

As can be seen in the drawings, the buckle connecting member 112 is arranged so as to be offset from the plane of the guide plate 110 such that a portion of the buckle 10 and the guide plate overlap somewhat. This makes the buckle pre-tensioning assembly more compact and, allows the buckle to fall smoothly downward without danger of striking the guide plate which otherwise might otherwise interfere with movement of the buckle 10.

To effect pulling of the slider 180, a cable end 126 of a cable 13 is set in the cable retainer portion 114. The cable 13 extends downwardly, parallel to the line C of FIG. 9 and a portion of the cable length is engaged around a roller 123 set onto a lower portion of the guide plate 110 by a bolt 129. From the roller 123, the cable 13 extends through a trigger mechanism 124 and from the trigger mechanism 124 through a tube body 147 which houses a compressed coil spring 149 of a drive mechanism 250. A second cable end 126b is secured to a piston 148 which, as well as exerting pulling force on the cable 13 when activated, also centers the cable 13 within the tube body 147 to prevent the cable 13 from abrasion due to contact with the coil spring 149 or the tube body 147. It will also be noted that the line of the cable 13 from the cable retainer portion 114 is offset from the center line C, which corresponds to the center of the bolt 116, this arrangement serves to further shorten the overall length of the slider assembly allowing the mechanism to become even more compact.

Figure 12:
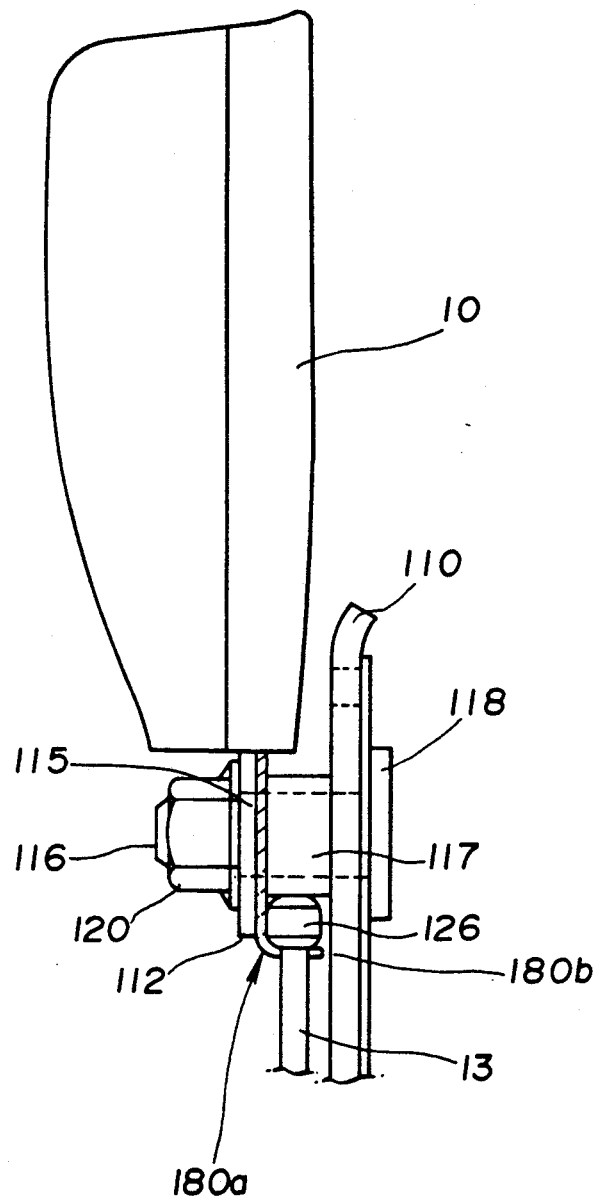
FIG. 12 shows a third embodiment of a slider assembly according to the present invention.

A further alternative embodiment of the slider assembly is shown in FIG. 12. In this embodiment the slider portion is of an L-shaped configuration consisting of a slider portion 180a and a cable retaining portion 180b. As in the previous embodiment, the spacer 117 is inserted between the slider 180 and the guide plate 110. According to this arrangement, the predetermined offset may be securely maintained and in addition, manufacturing costs may be reduced. With respect to the connection of the cable 13 and cable end 126, this embodiment is identical to the previous embodiment.

As described hereinabove, at a lower portion of the guide plate 110, a roller 123 is disposed on a bolt 129. In this embodiment, the roller 123 includes edge portions 123a, 123a, defining a cut-out portion 127. This allows the cable retaining portion 114 (or 180a and 180b) to be drawn closer to the roller when activated to the retracted position again allowing an overall length of the assembly to be reduced. Further, provision of a cable guide portion 128 ensures the cable is arranged parallel to the groove 220 and the longitudinal opening 119 and allows the curvature of the cut-out portion 127 to be kept to a small diameter.

The bolt 129 is backed by a web washer 230 so as to be rotatably mounted to a plate 131 which is fixed to a base 133. The base 133 is covered by a cover 132 within which the above-mentioned trigger mechanism 124 and a sensor mechanism 134 are arranged.

Referring again to FIG. 9, the base 133 is provided with a narrow opening 133a which permits the cable 13, which is inserted through a tube 135, to be introduced with the tube 135 into the base 133. It will be noted that a portion of the cable length is securely affixed to an inside portion of the tube 135 and is not freely movable through the tube 135. One end of the tube 135 is retained by a pawl 136 which is pivotable relative the base 133. Another portion of the pawl 136 is contacted with a link member 137 which contacts another link member 138. The engaging portions of the link members 137 and 138 may be formed with one surface being pointed and the other having a V-shaped cut therein for receiving the point, for example. An end of the link member 138 opposite that which engages the link member 137 may also be formed with a pointed end. This end rests in a receiving indentation formed in the base 133 as in the above described first embodiment. These engaged link members 137 and 138 are positioned closely to a pin 139 which is set in a sensor mass 240. The sensor mass 240 is movable relative to the base 133 on an axis 141.

Figure 13A:
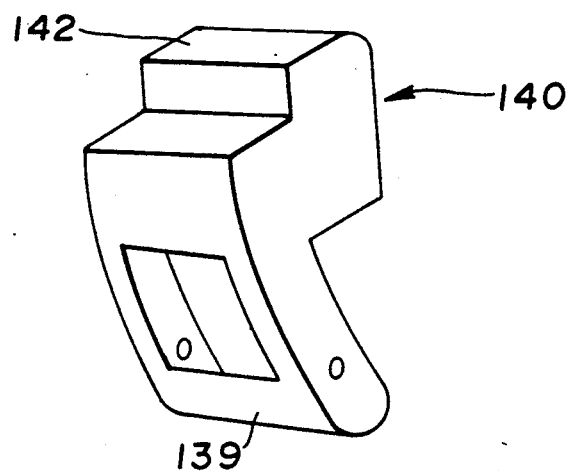
FIG. 13A is a perspective view of a sensor mass employed in the second embodiment of the present invention.
Figure 13B:
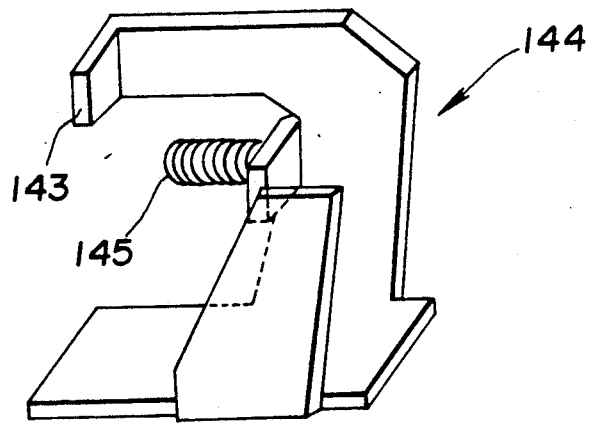
FIG. 13B is a perspective view of a support bracket for the sensor mass of FIG. 13A.
Figure 14:
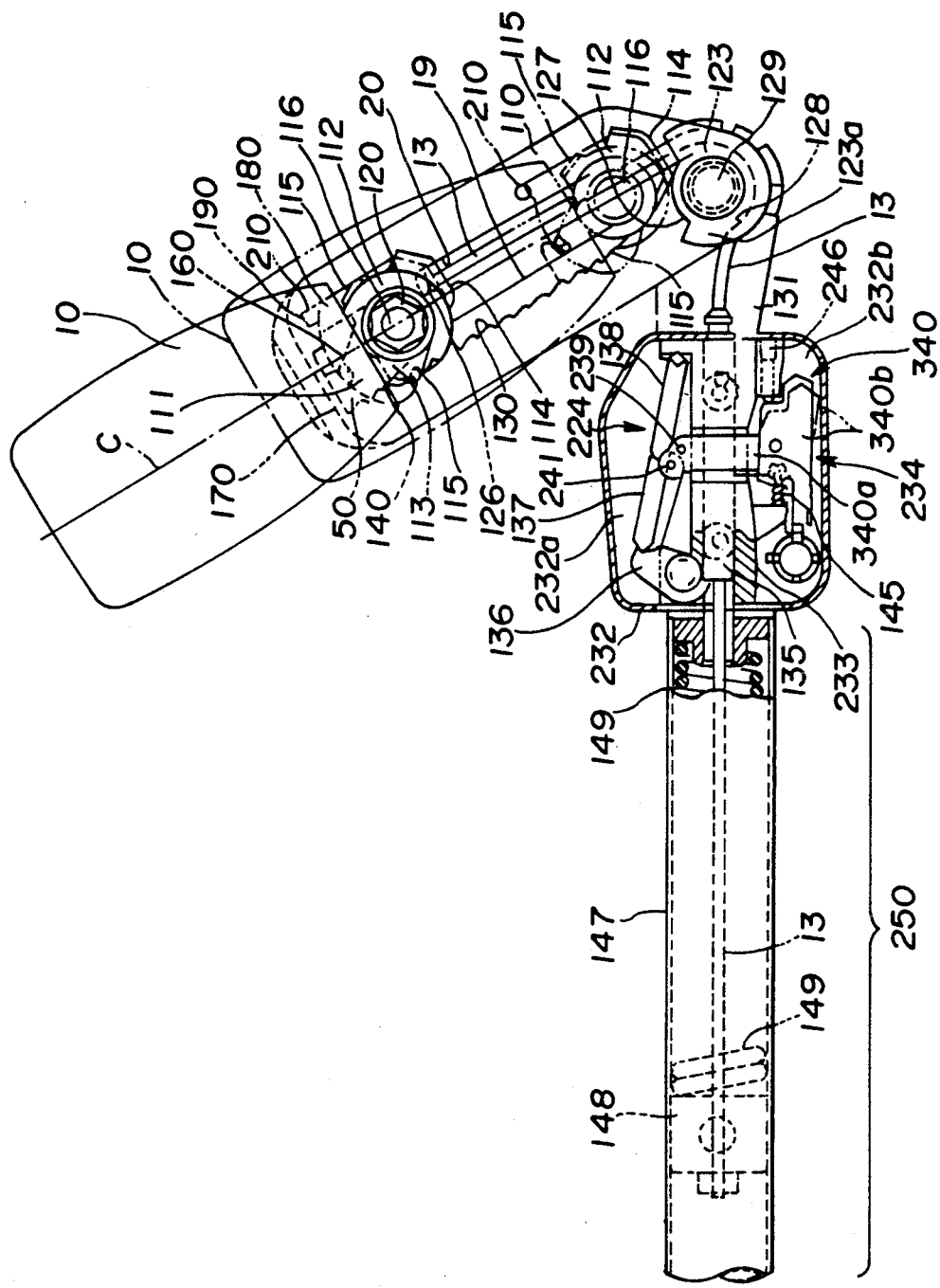
FIG. 14 is a cut-away side view of a third embodiment of a safety belt pre-tensioning system according to the invention.

Referring to FIGS. 13A and 13B a sensor mass 240 and a support bracket 144 therefore are illustrated. In FIG. 13A it can be seen that upper surface of the sensor mass 240 has a stepped-up portion 142 which forms a weight block of the sensor mass 240. The axis 141 allows the sensor mass 240 to pivot in the forward direction (to the right in FIG. 13A). The sensor mass is arranged with a support bracket 144 (FIG. 13B) which is affixed to the base 133. Referring to FIGS. 9 and 13A and 13B, a hook portion 143 of the support bracket 144 retains the sensor mass 240 by contacting the vertical portion of the step 142 while the forward facing portion of the sensor mass 240 rests against a spring 145 which is affixed to the support bracket 144. Thus the spring 145 is interposed between the sensor mass 240 and the support bracket 144. Alternatively, the surface of the sensor mass 240 which contacts the spring 145 may be formed with a depression therein for receiving the end of the spring for more securely maintaining the positioning thereof.

Attached to an end of the base 133 opposite an end at which the plate 131 is affixed, is the tube body 147 of the drive mechanism. As described hereinabove, the tube body 147 houses a drive means, which, in this embodiment comprises a compressed coil spring 149, of a drive mechanism 250. The second cable end 126b is secured to a piston 148. It will be noted that, according to this arrangement, when the drive mechanism is activated the piston 148 always moves in a direction away from the base 133.

Thus, similarly to the first embodiment, when an emergency condition, such as a collision occurs, the sensor mass is moved forward against the spring force of the spring 145 to an extent such that the pin 139 pushingly contacts the link members 137 and 138 causing them to give and to separate. This releases the pawl, causing it to move so as to release the tube 135 with the cable 13 affixed therein and thus the piston is momentarily and forcibly moved by the expansion of the coil spring 149. This sudden pulling of the cable 13 forcibly pulls the slider member 180, and related assembly, in the downward direction, forcing the buckle 10 and thus the safety belt (not shown) down toward the cushion of a seat (not shown) to securely restrict a seat occupant.

Hereinbelow, a third embodiment of a sensor portion of a safety belt system according to the present invention will be described with reference to FIGS. 14-19. It will be noted that the sensor mechanism of the third embodiment may be realized with the slider assemblies and drive mechanisms of any of the above described embodiments.

Figure 15:
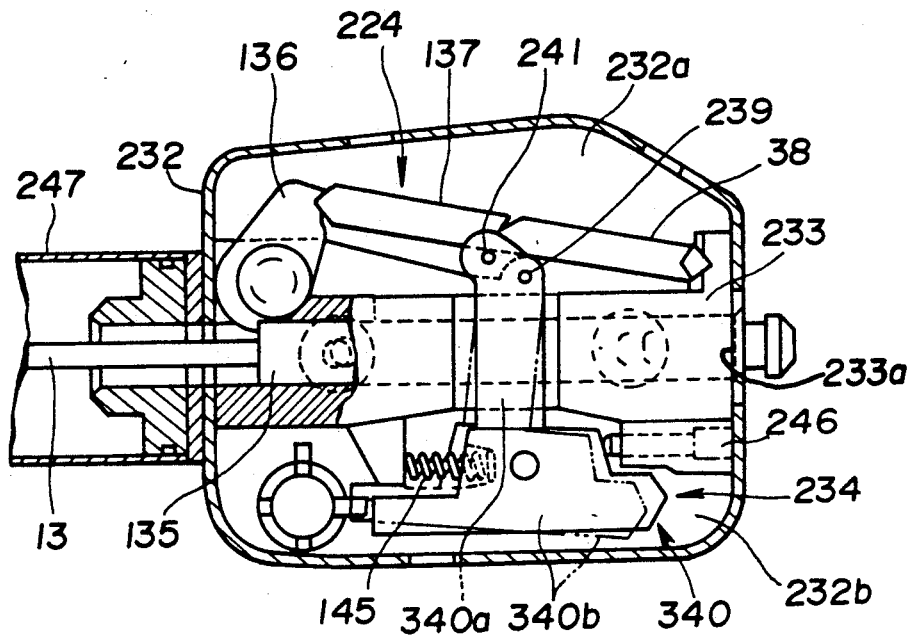
FIG. 15 is a detailed cut-away side view of a sensor mechanism of a third embodiment of the invention.
Figure 16:
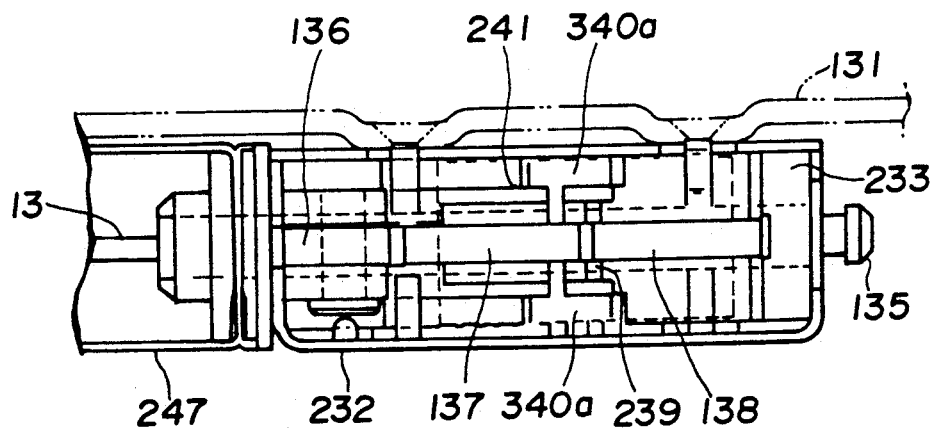
FIG. 16 is a plan view of the sensor mechanism of FIG. 15.
Figure 17B:
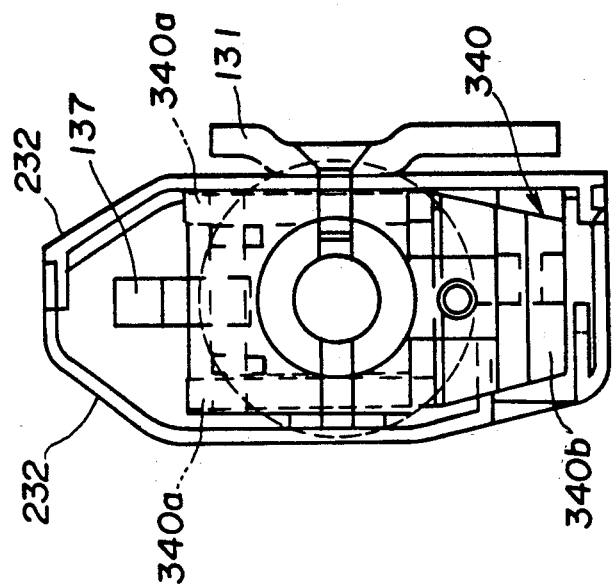
FIG. 17B is a cross-sectional rear view of the sensor mechanism of FIG. 15.
Figure 17A:
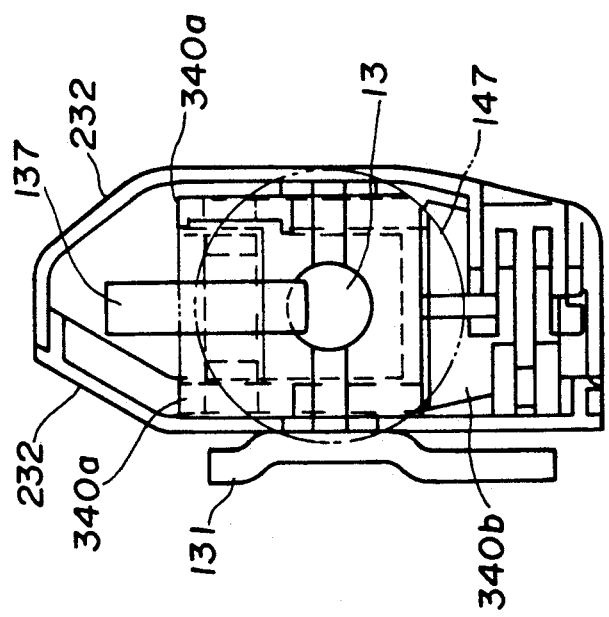
FIG. 17A is a cross-sectional front view of the sensor mechanism of FIG. 15.

As in the previous embodiment, and as may be seen in FIGS. 15 and 16, the base 233 is provided with a narrow opening 233a which permits the cable 13, which is passed through a tube 135, which tube is introduced into the base 233. It will be noted that a portion of the cable length is securely affixed to an inside portion of the tube 135 and is not freely movable through the tube 135. The sensor mechanism of the present embodiment however is divided into an upper chamber 232a, covered by a upper cover 232, and a lower chamber 232b, covered by a lower cover 234. In the trigger mechanism 224 in upper chamber 232a, one end of the tube 135 is retained by a pawl 136 which is pivotable relative to the base 233. Another portion of the pawl 136 is contacted with a link member 137 which contacts another link member 138. As in the previous embodiments, the engaging portions of the link members 137 and 138 may be formed with one surface being pointed and the other having a V-shaped cut therein for receiving the point, for example, and, an end of the link member 138 opposite that which engages the link member 137 may also be formed with a pointed end. This end rests in a receiving indentation formed in the base 233. These engaged link members 137 and 138 are positioned closely to a pin 241 which is set in arm portions 340a of a sensor mass 340. In the lower chamber 232b of the sensor mechanism, a weight block portion 340b of the sensor mass 340 is movable relative the base 233. The weight block portion 340b is suspended in the lower chamber 232a on an axis 239 set through the upwardly extending arm portions 340a which extend on both sides of the base. Thus, as in the above-described first embodiment, the weight block 340b of the sensor mass bridges the base from below in a swing-like arrangement. A spring 145 is set into a portion of the base 233 so as to oppose a surface of the sensor mass 340, that is, as in the second embodiment, the spring 145 is interposed between the base 233 and the sensor mass 340. Further, an adjustment screw 246 may be provided for setting the position of the block relative the pin 241 and for preventing rearward movement of the sensor mass 340. The arrangement of the sensor mass relative the upper and lower chambers and the relative position of the cable tube 135 and the tube body 147 of the drive mechanism 250 may be seen clearly in FIGS. 17A and 17B.

When vehicle motion indicating an emergency condition occurs, the sensor mass is moved forward against the spring force of the spring 145 to an extent such that the pin 241 pushingly contacts the link members 137 and 138 causing them to give and to separate. This releases the pawl 136, causing it to move so as to release the tube 135 with the cable 13 affixed therein and thus the piston is momentarily and forcibly moved by the expansion of the coil spring 149. This sudden pulling of the cable 13 forcibly pulls the slider member 280, and related assembly, in the downward direction, forcing the buckle 10 and thus the safety belt (not shown) down toward the cushion of a seat (not shown) to securely restrict a seat occupant.

Figure 19:
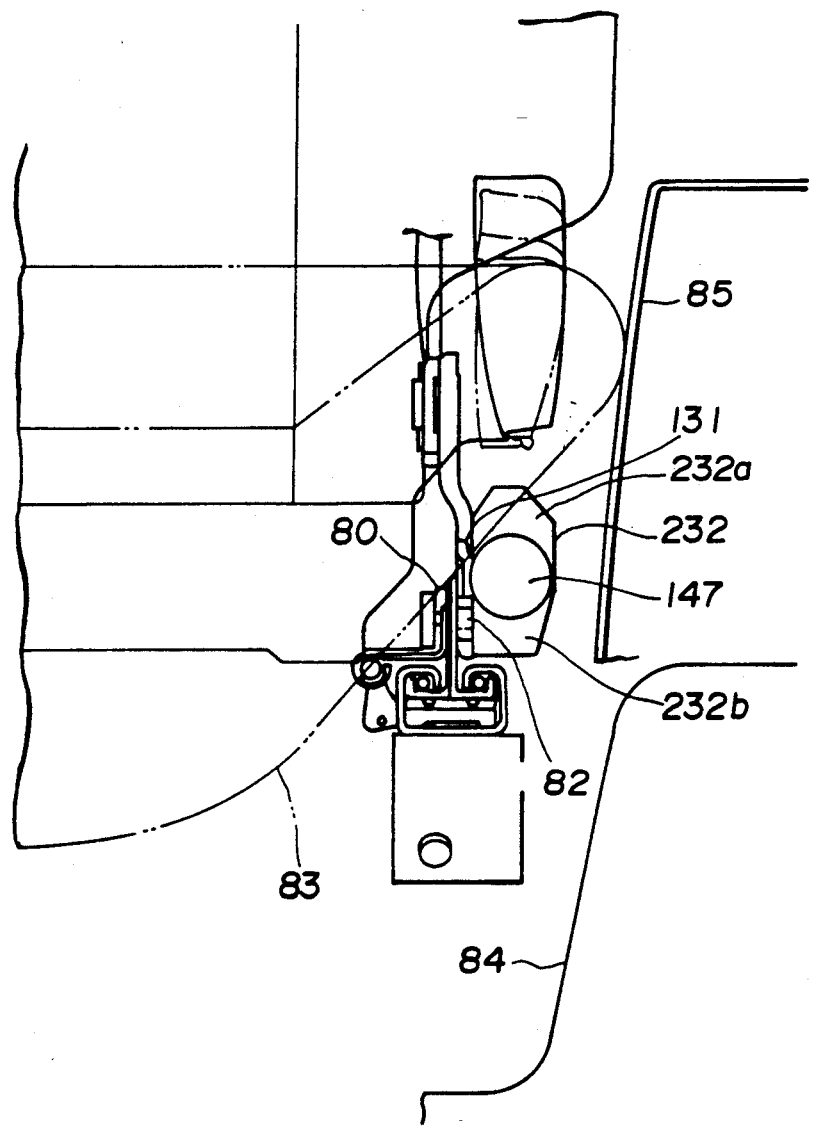
FIG. 19 is a front view showing an installed position of the apparatus of the invention relative a lower side portion of a vehicle seat.

As seen in FIG. 19, according to the above arrangements, a sensor mechanism may be made substantially thinner to take up less space when installed in a vehicle.

Figure 18:
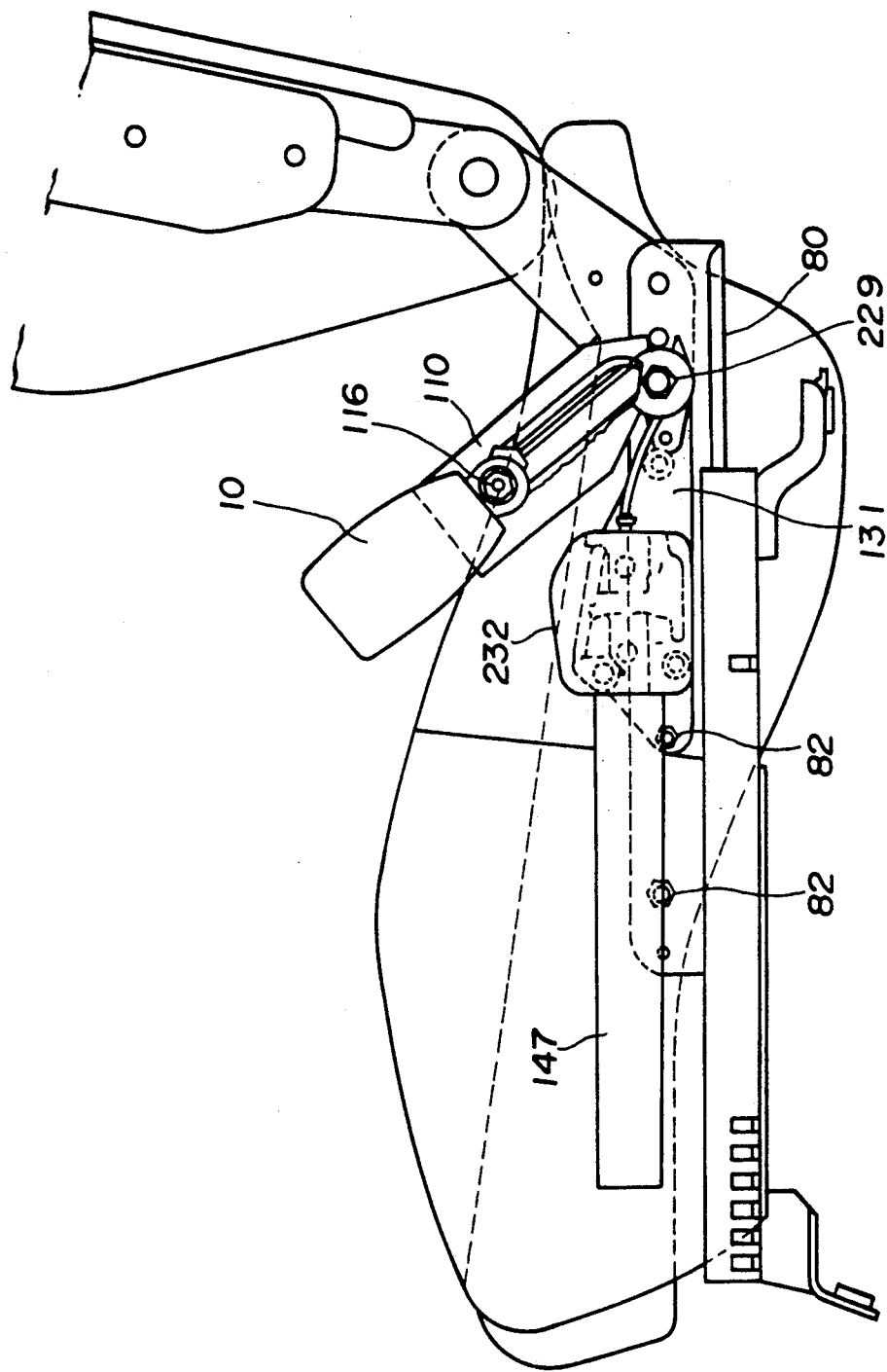
FIG. 18 is a side view showing an installed position of the apparatus of the invention relative a vehicle seat.

Referring now to FIGS. 18 and 19, the apparatus of the present invention is shown in an installed position relative a seat of a vehicle. As may be seen in the drawings, the plate 131 is attached to a side surface of an upper rail 80 of a seat mounting. Further, the tube body 147 of the drive mechanism is attached to a side surface of the upper rail 80 by bolts 82. It will be understood that, although, in the present embodiment the plate 131 and the tube body 147 are attached to the seat mounting by bolts, welding, adhesives or other means of attachment may also be utilized. As seen in FIG. 19, a side pad 83 may be installed at an inclined orientation without interference from the upper cover 232a, nor does the lower cover 232b interfere with either of a tunnel 84 or a console 85. Thus adequate room is available for installation of all necessary vehicle components in and around the seat. Further, installation of the compact safety belt pre-tensioning apparatus is simplified.

What is claimed is:

1. A vehicle safety belt arrangement having emergency retraction capability, comprising:

slider means associated with a buckle of a safety belt, said slider means being movable in at least one direction for effecting retraction of said safety belt toward a hip point of a vehicle seat;

a guide plate having formed therein a groove for guiding said slider means in said one direction;

sensor means including a base portion and a sensor mass, said sensor mass comprising two pivotable arm portions connected to a weight portion, said sensor mass being pivotable relative to said base portion so as to be movable in at least one direction and responsive to motion of said vehicle;

a bracket connected to said sensor means and said guide plate for establishing a predetermined positional relationship between said sensor means and said guide plate, said bracket further being attachable to a vehicle seat assembly;

drive means including a piston, said drive means being connected to a side of said sensor means opposite said bracket and operable to move said piston in a direction away from said bracket;

a roller mounted on said bracket, said guide plate and said roller being mounted on different surfaces of said bracket respectively;

a cable connecting said piston of said drive means to said slider means via said sensor means, a portion of said cable length engaging said roller for establishing a cable path from said slider means to said sensor means and another portion of said cable length being releasably fixed in position within said sensor means, said cable extending between said two arm portions; and trigger means associated with said sensor mass of said sensor means for activating said emergency retraction to a triggered position of said arrangement according to motion of said sensor mass indicative of an emergency condition, said trigger means releasing said portion of said cable length fixed within said sensor means to activate said drive means to move said piston away from said sensor means thus forcibly pulling said slider means in said one direction.

2. A vehicle safety belt arrangement having emergency retraction capability comprising:

slider means associated with a buckle of a safety belt, said slider means being movable in at least one direction for effecting retraction of said safety belt toward a hip point of a vehicle seat;

a guide plate having formed therein a groove for guiding said slider means in said one direction;

sensor means including a base portion and a sensor mass, said sensor mass being pivotable relative to said base portion so as to be movable in at least one direction and responsive to motion of said vehicle;

a bracket connected to said sensor means and said guide plate for establishing a predetermined positional relationship between said sensor means and said guide plate, said bracket further being attachable to a vehicle seat assembly and comprising two wall portion provided on one plane separated by a gap, and a fastening portion extending at right angles in a predetermined direction from an outer side of one of said wall portions for attachment to said sensor means, said bracket further including plane surfaces, at right angles to the fastening portion and the wall portions, adjoining the wall portions at corresponding sides thereof respectively and extending perpendicularly from said wall portions in the same direction as the fastening portion and, a mounting portion, at right angles to said plane surfaces and parallel to said wall portions, adjoined to ends of said plane surfaces opposite ends of the plane surfaces which adjoin said wall portions respectively and extending perpendicularly from said plane surfaces in the same direction as said wall portions and bridging said gap;

drive means including a piston, said drive means being connected to a side of said sensor means opposite said bracket and operable to move said piston in a direction away from said guide plate;

a roller mounted on said mounting portion of said bracket, said guide plate and said roller being mounted on different surfaces of said bracket respectively;

a cable connecting said piston of said drive means to said slider means via said sensor means, a portion of said cable length engaging said roller for establishing a cable path from said slider means to said sensor means and another portion of said cable length being releasably fixed in position within said sensor means; and trigger means associated with said sensor mass of said sensor means for activating said emergency retraction to a triggered position of said arrangement according to motion of said sensor mass indicative of an emergency condition, said trigger means releasing said portion of said cable length fixed within said sensor means to activate said drive means to move said piston away from said sensor means thus forcibly pulling said slider means in said one direction.

3. A safety belt arrangement as set forth in claim 2, wherein said fixed portion of said cable is fixed in a cable retaining tube which is releasably held in said sensor means.

4. A safety belt arrangement as set forth in claim 3, wherein said trigger means comprises a displaceable link member associated with a pawl, said link member supporting one portion of said pawl and another portion of said pawl retaining said cable retaining tube.

5. A safety belt arrangement as set forth in claim 4, wherein an end of the link member opposite the end supporting said pawl is an engaging portion which engages an engaging portion of a second link member, the engaging portion of one link member being formed with a V-shaped point and the other having a V-shaped cut therein for receiving said point, 6. A safety belt arrangement as set forth in claim 5, wherein an end of the second link member opposite that which engages said first link member may also be formed with a pointed end for engaging a receiving indentation formed in the base portion of said sensor means.

7. A safety belt arrangement as set forth in claim 4, further including an adjustment screw associated with said sensor means, said adjustment screw being movable for adjusting a position of said sensor mass relative to said link member of said trigger means for setting a degree of sensitivity of said sensor.

8. A safety belt arrangement as set forth in claim 3, wherein said cable retaining tube is introduced to said sensor means at a lower portion thereof substantially in a path of a straight line between a pivotal axis of said roller and a point at which said cable is attached to said piston of said drive means.

9. A safety belt arrangement as set forth in claim 3, wherein said cable retaining tube is introduced to said sensor means at a central portion thereof substantially in a path of a straight line between a pivotal axis of said roller and a point at which said cable is attached to said piston of said drive means.

10. A safety belt arrangement as set forth in claim 2, wherein said buckle and said slider means are arranged so as to overlap each other in a set position of said safety belt arrangement.

11. A safety belt arrangement as set forth in claim 2, wherein said slider means comprises a connection portion, a cable retaining portion, and a facing portion which slidingly contacts a surface of said guide plate, said connection, cable retaining and facing portions forming a U-shaped profile of said slider means and being slidingly attached to said guide plate via a bolt.

12. A safety belt arrangement as set forth in claim 11, wherein said connection portion, said cable retaining portion and said facing portion are integrally formed.

13. A safety belt arrangement as set forth in claim 12, wherein a spacer is provided between said connection portion and said facing portion.

14. A safety belt arrangement as set forth in claim 13, wherein a cover plate is positioned at an outer side of said guide plate.

15. A safety belt arrangement as set forth in claim 14, wherein said connection portion, said cable retaining portion, said facing portion, said latch, said guide plate, said spacer and said cover plate are commonly retained by a bolt, said spacer being coaxial with said bolt.

16. A safety belt arrangement as set forth in claim 2, wherein said slider means includes a latch, said latch being positioned on the same plane as said guide plate and being formed with ratchet teeth along a surface thereof facing a side of said guide groove along which ratchet teeth are formed, the ratchet teeth of said guide groove being continuously engaged with the ratchet teeth of said latch, a spring being provided in an upper part of the latch for biasing said ratchet teeth of said latch against the ratchet teeth of said guide groove.

17. A safety belt arrangement as set forth in claim 16, wherein a thickness of said latch is substantially equal to a thickness of said guide plate.

18. A safety belt arrangement as set forth in claim 16, wherein said slider means further includes a second connection portion attached to said buckle.

19. A safety belt arrangement as set forth in claim 2, wherein said cable path established by said roller is parallel to said guide groove of said guide plate.

20. A safety belt arrangement as set forth in claim 2, wherein a spring is interposed between a face of said sensor mass and a portion of a sensor mass mounting bracket.

21. A safety belt arrangement as set forth in claim 2, wherein said arrangement is attached to a vertical surface of an upper rail of a seat mount.

22. A safety belt arrangement as set forth in claim 2, wherein said drive mechanism is housed within a tube shaped body.

23. A safety belt arrangement as set forth in claim 22, wherein said tube shaped body is tapered at an end remote from said sensor.

24. A safety belt arrangement as set forth in claim 22, wherein said tube body is joined to said sensor means at a lower portion thereof substantially in a path of a straight line between a pivotal axis of said roller and a point at which said cable is attached to said piston of said drive means.

25. A safety belt arrangement as set forth in claim 22, wherein said tube body is joined to said sensor means at a central portion thereof substantially in a path of a straight line between a pivotal axis of said roller and a point at which said cable is attached to said piston of said drive means.

26. A safety belt arrangement as set forth in claim 2, wherein said drive means further includes a coil spring.

27. A vehicle safety belt arrangement having emergency retraction capability, comprising;
   slider means associated with a buckle of a safety belt, said slider means being movable in at least one direction for effecting retraction of said safety belt toward a hip point of a vehicle seat;
   a guide plate having formed therein a groove for guiding said slider means in said one direction;
   sensor means including a base portion and a sensor mass, said sensor mass being pivotable relative to said base portion so as to be movable in at least one direction and responsive to motion of said vehicle;
   a bracket connected to said sensor means and said guide plate for establishing a predetermined positional relationship between said sensor means and said guide plate, said bracket further being attachable to a vehicle seat or mounting thereof;
   drive means including a piston, said drive means being connected to a side of said sensor means opposite said bracket and operable to move said piston in a direction away from said bracket;
   a roller mounted on said bracket, said guide plate and said roller being mounted on different surfaces of said bracket respectively;
   a cable connecting said piston of said drive means to said slider means via said sensor means, a portion of said cable length engaging said roller for establishing a cable path from said slider means to said sensor means and another portion of said cable length being releasably fixed in position within said sensor means; and
   trigger means associated with said sensor mass of said sensor means for activating said emergency retraction to a triggered position of said arrangement according to motion of said sensor mass indicative of an emergency condition, said trigger means releasing said portion of said cable length fixed within said sensor means to activate said drive means to move said piston away from said sensor means thus forcibly pulling said slider means in said one direction;
   wherein said roller is disposed in a fully rotatable manner on said bracket and includes a central portion for contacting said cable and an upper circular hub having a diameter greater than that of said central portion, said upper circular hub having a cutout portion formed therein and an angled cable guide portion formed from a lower portion of the upper circular hub toward said central portion.

28. A vehicle safety belt arrangement having emergency retraction capability, comprising;
   slider means associated with a buckle of a safety belt, said slider means being movable in at least one direction for effecting retraction of said safety belt toward a hip point of a vehicle seat;
   a guide plate having formed therein a groove for guiding said slider means in said one direction;

sensor means including a base portion and a sensor mass, said sensor mass being pivotable relative to said base portion so as to be movable in at least one direction and responsive to motion of said vehicle;

a bracket connected to said sensor means and said guide plate for establishing a predetermined positional relationship between said sensor means and said guide plate, said bracket further being attachable to a vehicle seat or mounting thereof;

drive means including a piston, said drive means being connected to a side of said sensor means opposite said bracket and operable to move said piston in a direction away from said bracket;

a roller mounted on said bracket, said guide plate and said roller being mounted on different surfaces of said bracket respectively;

a cable connecting said piston of said drive means to said slider means via said sensor means, a portion of said cable length engaging said roller for establishing a cable path from said slider means to said sensor means and another portion of said cable length being releasably fixed in position within said sensor means; and trigger means associated with said sensor mass of said sensor means for activating said emergency retraction to a triggered position of said arrangement according to motion of said sensor mass indicative of an emergency condition, said trigger means releasing said portion of said cable length fixed within said sensor means to activate said drive means to move said piston away from said sensor means thus forcibly pulling said slider means in said one direction;

wherein said slider means has a hook portion engaging a perforation provided in said guide plate, said hook portion being so constructed as to easily disengage from said perforation upon activation of said trigger means.

29. A vehicle safety belt arrangement having emergency retraction capability, comprising;

slider means associated with a buckle of a safety belt, said slider means being movable in at least one direction for effecting retraction of said safety belt toward a hip point of a vehicle seat;

a guide plate having formed therein a groove for guiding said slider means in said one direction;

sensor means including a base portion and a sensor mass, said sensor mass being pivotable relative to said base portion so as to be movable in at least one direction and responsive to motion of said vehicle;

a bracket connected to said sensor means and said guide plate for establishing a predetermined positional relationship between said sensor means and said guide plate, said bracket further being attachable to a vehicle seat or mounting thereof;

drive means including a piston, said drive means being connected to a side of said sensor means opposite said bracket and operable to move said piston in a direction away from said bracket;

a roller mounted on said bracket, said guide plate and said roller being mounted on different surfaces of said bracket respectively;

a cable connecting said piston of said drive means to said slider means via said sensor means, a portion of said cable length engaging said roller for establishing a cable path from said slider means to said sensor means and another portion of said cable length being releasably fixed in position within said sensor means; and trigger means associated with said sensor mass of said sensor means for activating said emergency retraction to a triggered position of said arrangement according to motion of said sensor mass indicative of an emergency condition, said trigger means releasing said portion of said cable length fixed within said sensor means to activate said drive means to move said piston away from said sensor means thus forcibly pulling said slider means in said one direction;

wherein said slider means is vertically offset from, but parallel to the plane of said cable, said cable and said slider means being oriented substantially at a lateral center of the buckle.

30. A vehicle safety belt arrangement having emergency retraction capability, comprising;

slider means associated with a buckle of a safety belt, said slider means being movable in at least one direction for effecting retraction of said safety belt toward a hip point of a vehicle seat;

a guide plate having formed therein a groove for guiding said slider means in said one direction;

sensor means including a base portion and a sensor mass, said sensor mass being pivotable relative to said base portion so as to be movable in at least one direction and responsive to motion of said vehicle;

a bracket connected to said sensor means and said guide plate for establishing a predetermined positional relationship between said sensor means and said guide plate, said bracket further being attachable to a vehicle seat or mounting thereof;

drive means including a piston, said drive means being connected to a side of said sensor means opposite said bracket and operable to move said piston in a direction away from said bracket;

a roller mounted on said bracket, said guide plate and said roller being mounted on different surfaces of said bracket respectively;

a cable connecting said piston of said drive means to said slider means via said sensor means, a portion of said cable length engaging said roller for establishing a cable path from said slider means to said sensor means and another portion of said cable length being releasably fixed in position within said sensor means; and trigger means associated with said sensor mass of said sensor means for activating said emergency retraction to a triggered position of said arrangement according to motion of said sensor mass indicative of an emergency condition, said trigger means releasing said portion of said cable length fixed within said sensor means to activate said drive means to move said piston away from said sensor means thus forcibly pulling said slider means in said one direction;

wherein, in the triggered position, a lower portion of said slider overlaps said roller.

31. A vehicle safety belt arrangement having emergency retraction capability, comprising;

slider means associated with a buckle of a safety belt, said slider means being movable in at least one direction for effecting retraction of said safety belt toward a hip point of a vehicle seat;

a guide plate having formed therein a groove for guiding said slider means in said one direction;

sensor means including a base portion and a sensor mass, said sensor mass being pivotable relative to said base portion so as to be movable in at least one direction and responsive to motion of said vehicle;

a bracket connected to said sensor means and said guide plate for establishing a predetermined positional relationship between said sensor means and said guide plate, said bracket further being attachable to a vehicle seat or mounting thereof;

drive means including a piston, said drive means being connected to a side of said sensor means opposite said bracket and operable to move said piston in a direction away from said bracket;

a roller mounted on said bracket, said guide plate and said roller being mounted on different surfaces of said bracket respectively;

a cable connecting said piston of said drive means to said slider means via said sensor means, a portion of said cable length engaging said roller for establishing a cable path from said slider means to said sensor means and another portion of said cable length being releasably fixed in position within said sensor means; and trigger means associated with said sensor mass of said sensor means for activating said emergency retraction to a triggered position of said arrangement according to motion of said sensor mass indicative of an emergency condition, said trigger means releasing said portion of said cable length fixed within said sensor means to activate said drive means to move said piston away from said sensor means thus forcibly pulling said slider means in said one direction;

wherein a spring is interposed between a face of said sensor mass and a portion of said base.

32. A safety belt arrangement as set forth in claim 31, wherein said sensor mass includes a depression for receiving said spring.

33. A vehicle safety belt arrangement having emergency retraction capability, comprising:

slider means associated with a buckle of a safety belt, said slider means being movable in at least one direction for effecting retraction of said safety belt toward a hip point of a vehicle seat;

a guide plate having formed therein a groove for guiding said slider means in said one direction;

sensor means including a base portion and a sensor mass, said sensor mass being pivotable relative to said base portion so as to be movable in at least one direction and responsive to motion of said vehicle, said sensor means including a support bracket which is affixed to the base portion, said support bracket including a hook portion which retains said sensor mass by contacting a rearward vertical surface of a step portion formed in a weight block portion of the sensor mass, the forward facing portion of the sensor mass resting against a spring which is affixed to the support bracket, the spring being interposed between the sensor mass and the support bracket;

a bracket connected to said sensor means and said guide plate for establishing a predetermined positional relationship between said sensor means and said guide plate, said bracket further being attachable to a vehicle seat or mounting thereof;

drive means including a piston, said drive means being connected to a side of said sensor means opposite said bracket and operable to move said piston in a direction away from said bracket;

a roller mounted on said bracket, said guide plate and said roller being mounted on different surfaces of said bracket respectively;

a cable connecting said piston of said drive means to said slider means via said sensor means, a portion of said cable length engaging said roller for establishing a cable path from said slider means to said sensor means and another portion of said cable length being releasably fixed in position within said sensor means; and trigger means associated with said sensor mass of said sensor means for activating said emergency retraction to a triggered position of said arrangement according to motion of said sensor mass indicative of an emergency condition, said trigger means releasing said portion of said cable length fixed within said sensor means to activate said drive means to move said piston away from said sensor means thus forcibly pulling said slider means in said one direction.

34. A vehicle safety belt arrangement having emergency retraction capability, comprising:

a slider means associated with a buckle of a safety belt, said slider means being movable in at least one direction for effecting retraction of said safety belt toward a hip point of a vehicle seat;

a guide plate having formed therein a groove for guiding said slider means in said one direction, said guide plate having a roller mounted on a bottom portion thereof;

sensor means including a base portion and a sensor mass, said sensor mass comprising two pivotable arm portions connected to a weight portion, said sensor mass being pivotable relative to said base portion so as to be movable in at least one direction and responsive to motion of said vehicle;

a plate, a mounting of said roller attaching a portion of said plate to said guide plate, another portion of said plate being attached to said sensor means, said plate establishing a predetermined positional relationship between said guide plate and said sensor means, said plate further being attachable to a mounting of a vehicle seat;

drive means including a piston, said drive means being connected to a side of said sensor means opposite said plate and operable to move said piston in a direction away from said plate;

a cable connecting said piston of said drive means to said slider means via said sensor means, a portion of said cable length engaging said roller for establishing a cable path from said slider means to said sensor means and another portion of said cable length being releasably fixed in position within said sensor means, said cable extending between said two arm portions; and trigger means associated with said sensor mass of said sensor means for activating said emergency retraction to a triggered position of said arrangement according to motion of said sensor mass indicative of an emergency condition, said trigger means releasing said portion of said cable length fixed within said sensor means to activate said drive means to move said piston away from said sensor means thus forcibly pulling said slider means in said one direction.

35. A vehicle safety belt arrangement having emergency retraction capability, comprising:
   slider means associated with a buckle of a safety belt, said slider means being movable in at least one direction for effecting retraction of said safety belt toward a hip point of a vehicle seat;
   a guide plate having formed therein a groove for guiding said slider means in said one direction, said guide plate having a roller mounted on a bottom portion thereof;
   sensor means including a base portion and a sensor mass, said sensor mass being pivotable relative to said base portion and movable in at least one direction and responsive to motion of said vehicle;
   a plate, a mounting of said roller attaching a portion of said plate to said guide plate, another portion of said plate being attached to said sensor means, said plate establishing a predetermined positional relationship between said guide plate and said sensor means, said plate further being attachable to a mounting of a vehicle seat;
   drive means including a piston, said drive means being connected to a side of said sensor means opposite said plate and operable to move said piston in a direction away from said plate;
   a cable connecting said piston of said drive means to said slider means via said sensor means, a portion of said cable length engaging said roller for establishing a cable path from said slider means to said sensor means and another portion of said cable length being releasably fixed in position within said sensor means, said cable path between said slider means and said roller being offset from and parallel to a center line defined through a longitudinal center of the buckle parallel to the guide groove of said guide plate; and
   trigger means associated with said sensor mass of said sensor means for activating said emergency retraction to a triggered position of said arrangement according to motion of said sensor mass indicative of an emergency condition, said trigger means releasing said portion of said cable length fixed within said sensor means to activate said drive means to move said piston away from said sensor means thus forcibly pulling said slider means in said one direction.

36. A safety belt arrangement as set forth in claim 35, wherein a portion of said cable path is parallel to said guide groove.

37. A safety belt arrangement as set forth in claim 35, wherein said slider means is of an L-shaped configuration consisting of a slider portion and a cable retaining portion.

38. A safety belt arrangement as set forth in claim 35, wherein said slider means is vertically offset from, but parallel to the plane of said cable, said cable and said slider means being oriented substantially at a lateral center of the buckle.

39. A safety belt arrangement as set forth in claim 34, wherein said buckle and said slider means are arranged so as to overlap each other in a set position of said arrangement.

40. A safety belt arrangement as set forth in claim 35, wherein said roller includes a central portion for receiving said cable and an upper circular hub having a diameter greater than that of said central portion, said upper circular hub having a cutout portion formed therein and an angled cable guide portion formed from a lower portion of the upper circular hub toward said central portion.

41. A safety belt arrangement as set forth in claim 35, wherein said fixed portion of said cable is fixed in a cable retaining tube which is releasably held in said sensor means.

42. A safety belt arrangement as set forth in claim 41, wherein said trigger means comprises a displaceable link member associated with a pawl, said link member supporting one portion of said pawl and another portion of said pawl retaining said cable retaining tube.

43. A safety belt arrangement as set forth in claim 35, wherein said slider means has a hook portion engaging a perforation provided in said guide plate, said hook portion being so constructed as to easily disengage from said perforation upon activation of said trigger means.

44. A safety belt arrangement as set forth in claim 35, wherein said slider means comprises a connection portion, a cable retaining portion, and a facing portion which slidingly contacts a surface of said guide plate, said connection, cable retaining and facing portions forming a U-shaped profile of said slider means and being slidingly attached to said guide plate via a bolt.

45. A safety belt arrangement as set forth in claim 44, wherein said connection portion, said cable retaining portion and said facing portion are integrally formed.

46. A safety belt arrangement as set forth in claim 44, wherein a spacer is provided between said connection portion and said facing portion.

47. A safety belt arrangement as set forth in claim 46, wherein a cover plate is positioned at an outer side of said guide plate.

48. A safety belt arrangement as set forth in claim 47, wherein said connection portion, said cable retaining portion, said facing portion, said latch, said guide plate, said spacer and said cover plate are commonly retained by a bolt, said spacer being coaxial with said bolt.

49. A safety belt arrangement as set forth in claim 44, wherein said slider means further includes a second connection portion attached to said buckle.

50. A safety belt arrangement as set forth in claim 35, wherein said slider means includes a latch, said latch being positioned on the same plane as said guide plate and being formed with ratchet teeth along a surface thereof facing a side of said guide groove along which ratchet teeth are formed, the ratchet teeth of said guide groove being continuously engaged with the ratchet teeth of said latch, a spring being provided in an upper part of the latch for biasing said ratchet teeth of said latch against the ratchet teeth of said guide groove.

51. A safety belt arrangement as set forth in claim 50, wherein a thickness of said latch is substantially equal to a thickness of said guide plate.

52. A safety belt arrangement as set forth in claim 35, wherein, in the triggered position, a lower portion of said slider means overlaps said roller.

53. A safety belt arrangement as set forth in claim 35, wherein said sensor means is divided into an upper chamber covered by an upper cover and a lower chamber covered by a lower cover said upper and lower chambers being separated by said base portion, said trigger means being arranged in the upper chamber such that said fixed portion of said cable is retained by a pawl which is pivotable relative to the base, another portion of said pawl being contracted with a link member comprising first and second links engaged with each other at one end thereof respectively.

54. A safety belt arrangement as set forth in claim 53, wherein an engaging end of one link is formed with a V-shaped point and an engaging end of the other link has a V-shaped cut therein for receiving said V-shaped point.

55. A safety belt arrangement as set forth in claim 53, wherein said engaged link members are positioned closely to a pin which is set in two pivotable arm portions of said sensor mass in the upper chamber of the sensor means for being displaced by said pin according to movement of said sensor mass, said arm portions extending upwardly from a weight block portion of the sensor mass and being mounted on a rotatable axis such that the weight block portion is movable relative to the base portion.

56. A safety belt arrangement as set forth in claim 55, wherein said weight block portion is suspended by said axis in swing-like fashion bridging said base portion from below in said lower chamber of said sensor means, and said arm portions extend on opposing sides of the base portion.

57. A safety belt arrangement as set forth in claim 55, wherein an adjustment screw is provided for setting the position of the weight block portion of said sensor mass for preventing rearward movement of the sensor mass.

58. A safety belt arrangement as set forth in claim 53, wherein an end of the second link opposite that which engages said first link may also be formed with a pointed end for engaging a receiving indentation formed in the base portion.

59. A safety belt arrangement as set forth in claim 35, wherein a spring is set into a portion of the base portion so as to be interposed between the base portion and the sensor mass.

60. A safety belt arrangement as set forth in claim 35, wherein said sensor mass is mounted on said base portion on a rotatable axis via arm portions extending downwardly from a weight block portion thereof, a pin for displacing links of said trigger means being provided proximate said axis and said links being arranged below said weight block portion between said arm portions.

61. A safety belt arrangement as set forth in claim 60, wherein said sensor means is arranged with a support bracket which is affixed to the base portion, said support bracket including a hook portion which retains the sensor mass by contacting a rearward vertical surface of a step formed in the weight block portion, the forward facing portion of the sensor mass resting against a spring which is affixed to the support bracket, the spring being interposed between the sensor mass and the support bracket.

62. A safety belt arrangement as set forth in claim 35, wherein said sensor mass is comprised of two pivotable arm portions and a weight portion, said weight portion bridging said base portion from below.

63. A safety belt arrangement as set forth in claim 35, wherein said sensor mass is comprised of two pivotable arm portions and a weight portion, said weight portion bridging an upper portion of the base portion.

64. A safety belt arrangement as set forth in claim 35, wherein a spring is interposed between a face of said sensor mass and a portion of a sensor mass mounting bracket.

65. A safety belt arrangement as set forth in claim 64, wherein said sensor mass includes a depression for receiving said spring.

66. A safety belt arrangement as set forth in claim 35, wherein a spring is interposed between a face of said sensor mass and a portion of said base portion.

67. A safety belt arrangement as set forth in claim 35, wherein said drive mechanism is housed within a tube shaped body.

68. A safety belt arrangement as set forth in claim 67, wherein said tube shaped body is tapered at an end remote from said sensor means.

69. A safety belt arrangement as set forth in claim 67, wherein said tube shaped body is joined to said sensor means at a lower portion thereof substantially in a path of a straight line between a pivotal axis of said roller and a point at which said cable is attached to said piston of said drive means.

70. A safety belt arrangement as set forth in claim 67, wherein said tube shaped body is joined to said sensor at a central portion thereof substantially in a path of a straight line between a pivotal axis of said roller and a point at which said cable is attached to said piston of said drive means.

71. A safety belt arrangement as set forth in claim 35, wherein said arrangement is attached to a vertical surface of an upper rail of a seat mount.

72. A safety belt arrangement as set forth in claim 35, wherein said sensor mass includes a step portion forming a weight.

73. A safety belt arrangement as set forth in claim 35, wherein said drive means further includes a coil spring.

* * * * *